US007816818B2

(12) United States Patent
Sellecchia

(10) Patent No.: US 7,816,818 B2
(45) Date of Patent: Oct. 19, 2010

(54) STOVE KNOB TIMER DEVICE

(76) Inventor: Vincent Sellecchia, P.O. Box 468, Pomona, NY (US) 10970

( * ) Notice: Subject to any disclaimer, the term of this patent is extended or adjusted under 35 U.S.C. 154(b) by 405 days.

(21) Appl. No.: 11/970,667

(22) Filed: Jan. 8, 2008

(65) Prior Publication Data

US 2009/0044381 A1 Feb. 19, 2009

Related U.S. Application Data

(60) Provisional application No. 60/956,381, filed on Aug. 16, 2007.

(51) Int. Cl.
*H02H 3/027* (2006.01)
*H02H 3/033* (2006.01)
*H02H 3/04* (2006.01)
*F24C 3/12* (2006.01)

(52) U.S. Cl. ........................................ 307/326; 126/42

(58) Field of Classification Search ................. 307/326; 340/500, 506, 526, 539.27, 640; 126/42; 219/445.1, 385
See application file for complete search history.

(56) References Cited

U.S. PATENT DOCUMENTS

| | | | | |
|---|---|---|---|---|
| 4,446,455 | A * | 5/1984 | Nashawaty | 340/568.1 |
| 4,756,336 | A | 7/1988 | Amezcua | |
| 5,608,378 | A * | 3/1997 | McLean et al. | 340/568.1 |
| 5,854,520 | A | 12/1998 | Buck et al. | |
| 6,239,414 | B1 * | 5/2001 | Newcomer | 219/447.1 |
| 6,294,994 | B1 | 9/2001 | Hoellerich | |
| 7,002,109 | B2 * | 2/2006 | Klask | 219/445.1 |
| 7,171,727 | B2 | 2/2007 | Wylie | |
| 2003/0154970 | A1 | 8/2003 | Huang | |
| 2006/0016799 | A1 | 1/2006 | Klask | |
| 2006/0234177 | A1 | 10/2006 | Yu et al. | |

* cited by examiner

*Primary Examiner*—Albert W Paladini
(74) *Attorney, Agent, or Firm*—Dale J. Ream

(57) ABSTRACT

A stove knob timer device for use with a stove prompts a user to monitor a cooking event through a series of increasingly aggressive audible prompts. The timer device includes a main housing for engaging a stove operational shaft and which, when rotated to activate a respective stove burner, actuates a timer. After a predetermined time, a speaker is activated to emit an audible alarm to prompt a user to monitor the stove and to require a reset button to be pressed. If the reset button is not pressed in a predetermined time, the speaker is actuated to emit a more aggressive alarm so as to more urgently or even awaken a user. If the timer is reset, the original predetermined time is restarted. The timer device may include programming to adjust between timer modes and have structures enabling universal fit on various stove configurations.

20 Claims, 15 Drawing Sheets

STOVE KNOB TIMER DEVICE

REFERENCE TO RELATED APPLICATIONS

This application relates to and claims the benefit of a previously filed U.S. Provisional Pat. App. Ser. No. 60/956,381 filed Aug. 16, 2007, and entitled Stove Knob Timer Device.

BACKGROUND OF THE INVENTION

This invention relates generally to an operational control knob for use with a stove and, more particularly, to a stove knob timer device that provides a first gentle alert after the stove knob has activated a stove heat source and then increasingly aggressive alarm sounds if the knob is not reset or otherwise monitored by a user.

The most common cause of residential fires is unattended use of a stove or range oven. Three in ten reported house fires start in the kitchen. Frequently, this type of residential fire begins and gets out of control while the cook is away from the immediate vicinity of the stove. Unattended cooking is the leading cause of home cooking fires. Constant supervision of a cooking event is, of course, preferable and, in most cases, would prevent most of these types of fires. Unfortunately, however, the cook may become inattentive due to distractions or due to other physical factors. For example, the elderly or others with memory disabilities may simply forget to check on the stove after beginning to cook something. Further, the cook may fall asleep or otherwise become sidetracked in another room. In the meantime, the active stove burner may result in a fire that may grow out of control and become a source of great property loss or even loss of life. Or, a stove knob on an electric stove may be left on after an electric power outage and then may cause a fire when it comes back on when electricity is resumed.

Various devices have been proposed in the prior art that cause a loud alarm or that actually turn off a stove burner after a predetermined amount of time unless a user takes some predetermined action. Although assumably effective for their intended purposes, the existing devices do not provide for consistent monitoring of cooking on a stove through a series of progressively more aggressive alarm stages. More particularly, the existing devices may provide an immediate and sudden alarm that may potentially cause a coronary or neurological problem. Individuals suffering from certain heart conditions and especially elderly persons are susceptible to life threatening medical issues if alarmed or awakened too suddenly. Further, the present devices must be wired directly to the stove at the factory rather than being adapted for universal fit and use with any stove.

Therefore, it would be desirable to have a stove knob timer device that includes a timer that is actuated simultaneously when the knob activates a stove burner. Further, it would be desirable to have a stove knob timer device that requires a user to periodically reset the timer and, consequently, to monitor an ongoing cooking operation. In addition, it would be desirable to have a stove knob timer device that provides progressive stages of audible sounds in order to prompt a cook to monitor a cooking event and periodically reset the knob. An increasingly more aggressive alarm sequence would be particularly advantageous to elderly people who seek to maintain independent and active lifestyles.

SUMMARY OF THE INVENTION

Accordingly, a stove knob timer device according to the present invention includes a base member and a main housing rotatably coupled to the base member, the main housing being configured to receive a stove operational shaft. The stove knob timer device further includes a speaker, a timer, a reset switch, and a processor in the main housing. The processor is in data communication with the speaker, timer, and reset switch. Further, there is programming in the processor to actuate the speaker in a first manner upon the timer reaching a predetermined amount of time and to actuate the speaker in a second manner upon the speaker being actuated in the first manner for a predetermined amount of time. There is also programmer in the processor for deactivating the speaker upon actuation of the reset switch.

One of the greatest advantages and features of this invention is that there is nothing that a user, such as an elderly person, must remember to do to activate the timer. Once the stove knob is turned to actuate a burner so as to heat a pan or pot, the timer is automatically activated and will remind the user after a predetermined time that the burner is still activated. In some embodiments, the user may alter the predetermined time as desired. Otherwise, a default time is utilized.

Therefore, a general object of this invention is to provide a stove knob timer device that periodically prompts a user to reset a timer and, as a result, to monitor the status of a cooking event on the stove.

Another object of this invention is to provide a stove knob timer device, as aforesaid, that provides multiple stages of an audible signal ranging from a gentle chime to an aggressive alarm.

Still another object of this invention is to provide a stove knob timer device, as aforesaid, that actuates a timer simultaneously with activating a stove burner.

Yet another object of this invention is to provide a stove knob timer device, as aforesaid, in which the alarm signal begins at a volume and sequence that minimizes sudden shock to a user.

A further object of this invention is to provide a stove knob timer device, as aforesaid, that may be easily attached to various stove models and may be easily removable as well.

A still further object of this invention is to provide a stove knob timer device, as aforesaid, that is easy to use and cost-effective to manufacture.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
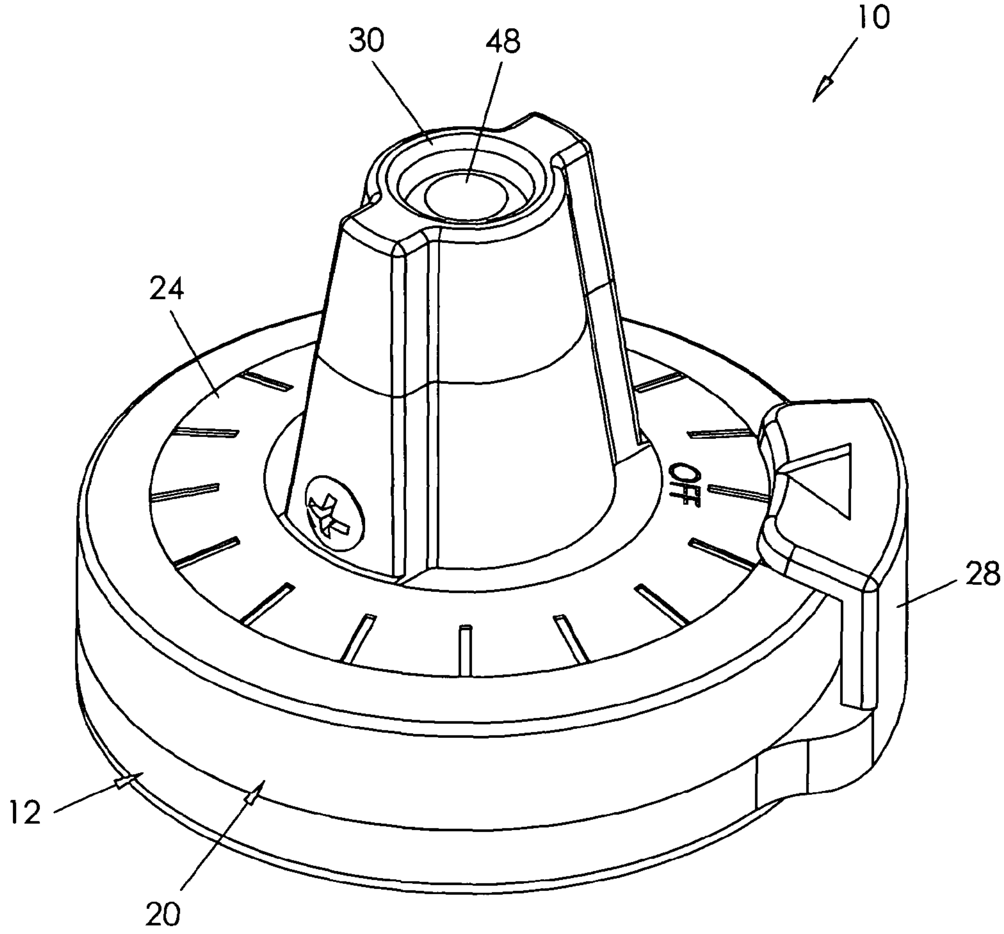
FIG. 1 is a perspective view of a stove knob timer device according to on embodiment of the present invention.
Figure 2:
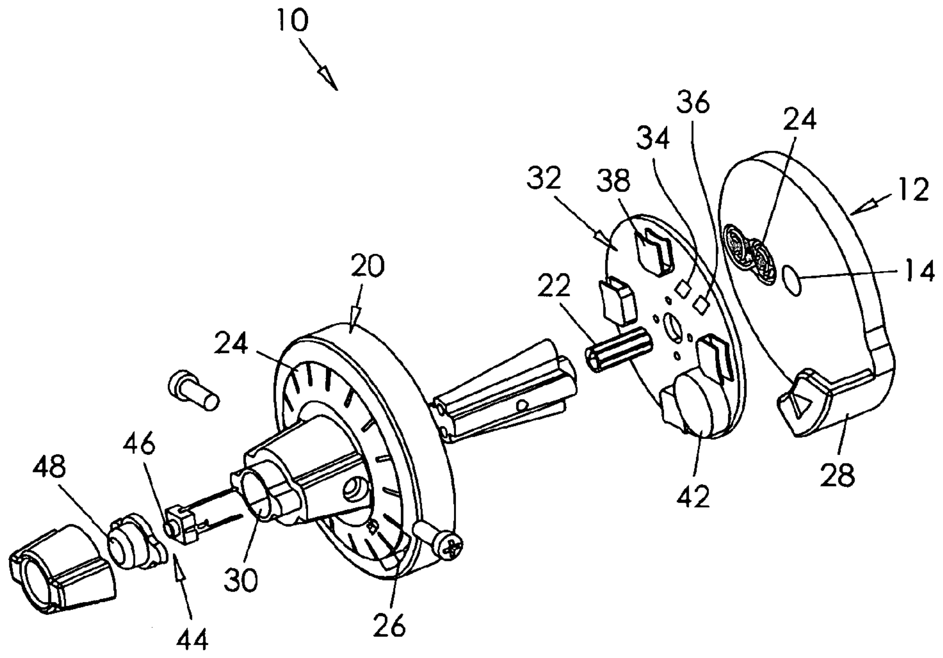
FIG. 2 is an exploded view of the timer device as in FIG. 1.

A stove knob timer device according to the present invention will now be described in detail with reference to FIGS. 1-9*b* of the accompanying drawings. In one embodiment of the invention shown in FIGS. 1 to 5*b*, the stove timer knob device 10 includes a main housing 20, a base member 12, a reset assembly 44, and a circuit board 32 (FIG. 2).

More particularly, the base member 12 defines a central opening 14 having a configuration complementary to the configuration of a stove burner control shaft (not shown) and may be coupled thereto by inserting the shaft through the central opening 14. A bottom surface of the base member 12 may include an adhesive layer 16 such that the base member 12 may be permanently mounted against the stove surface after having been inserted upon burner operation shaft. It is understood that the central opening includes a configuration that allows the stove operation shaft to turn freely therein.

The main housing 20 is coupled to the base member 12 for rotational movement relative thereto. In other words, the main housing 20 is configured to move as a rotary dial in a manner substantially similar to a traditional stove knob. The main housing includes a central bore having a configuration for receiving the stove operational shaft and being coupled thereto in a friction fit relationship. An appropriate removable hub 22 may be also included in order to enable the main housing 20 to be attached to the stove's burner operation shaft. In other words, use of a respective hub 22 enables the stove knob timer device 10 to be used universally with stoves of many designs and configurations. It should now be understood that as the main housing 20 is rotated by a user, a respective stove burner operational shaft is rotated to activate an associated stove burner. A label ring 24 is preferably situated atop a front surface of the main housing 20 to indicate respective heat settings to a user.

Figure 3A:
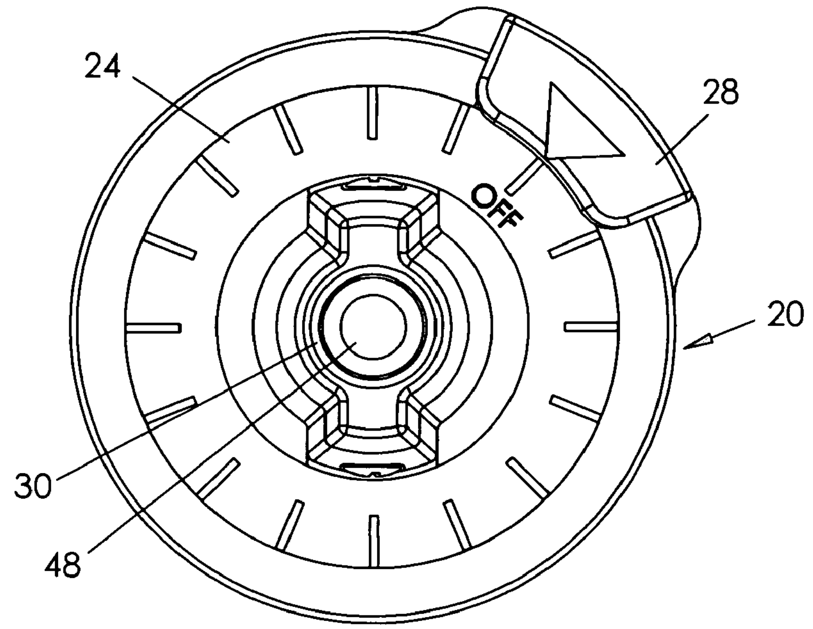
FIG. 3*a* is a top view of the timer device as in FIG. 1 in an “off” configuration.
Figure 3B:
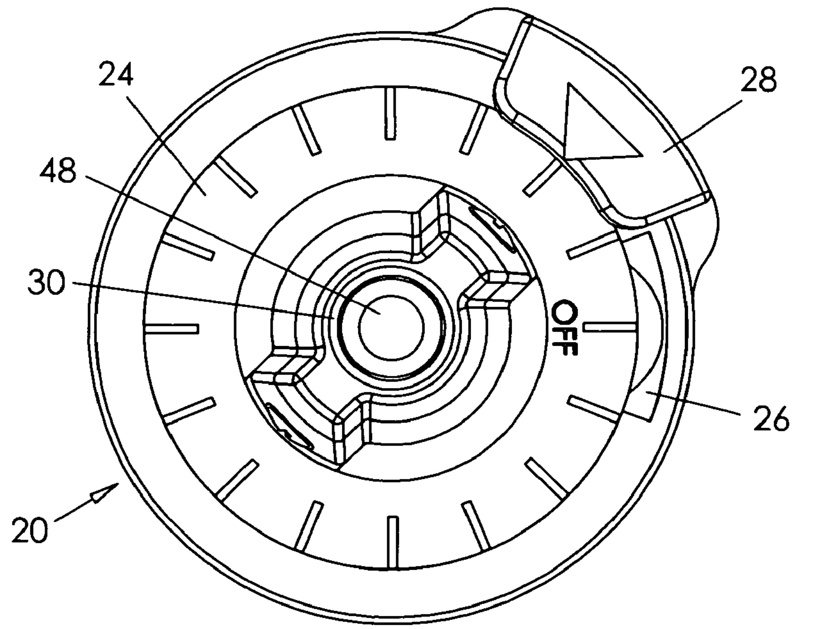
FIG. 3*b* is a top view of the of the timer device as in FIG. 3*a* in an activated configuration.
Figure 4:
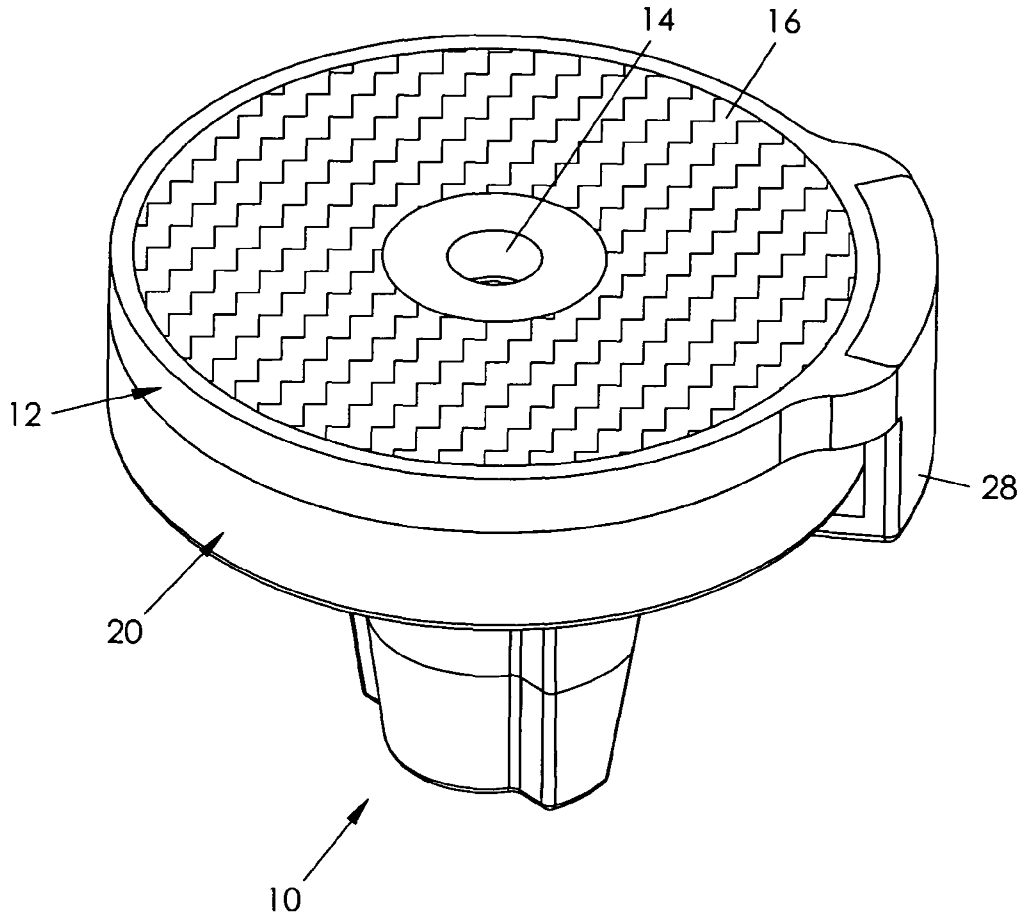
FIG. 4 is an inverted perspective view of the timer device as in FIG. 1.
Figure 5A:
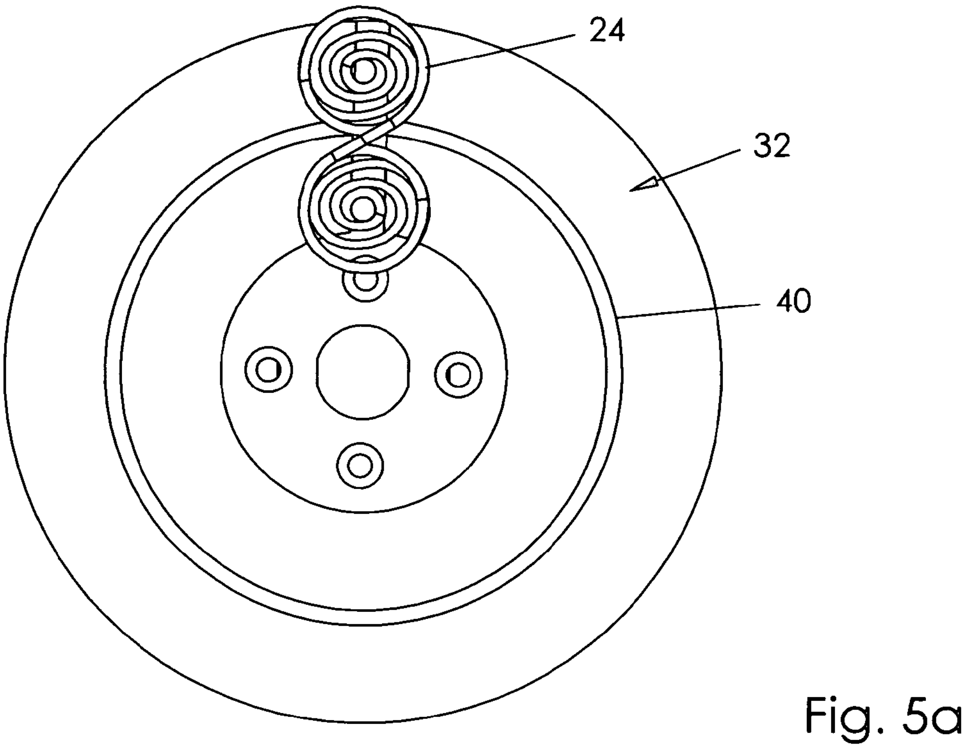
FIG. 5*a* is a bottom view of the circuit board in one configuration including the spring from the base member, but otherwise with the base member and all other components removed for clarity.
Figure 5B:
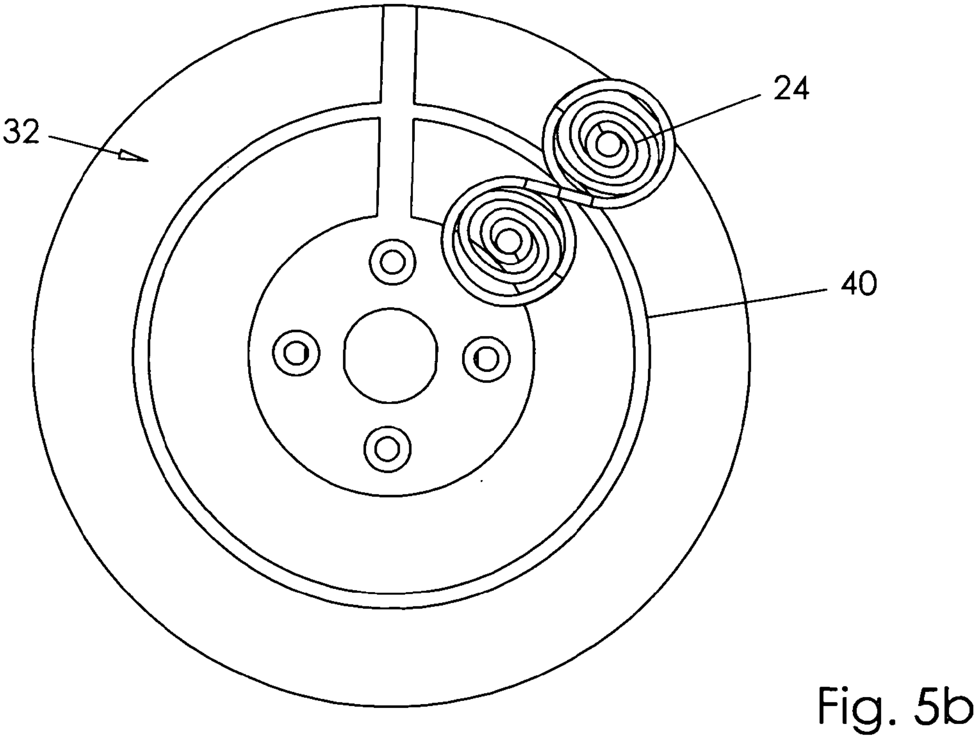
FIG. 5*b* is another view as in FIG. 5*a* in another configuration.
Figure 6A:
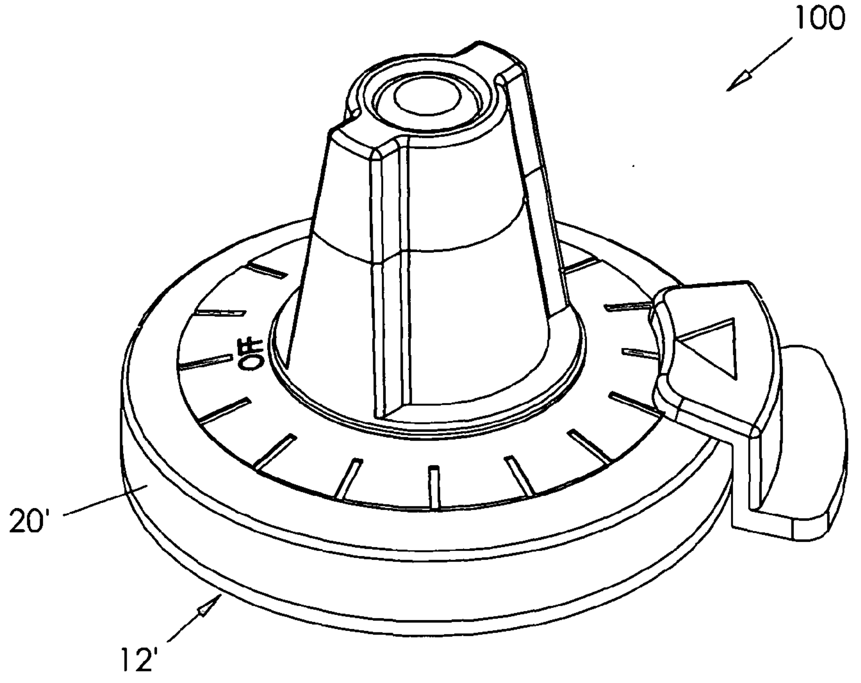
FIG. 6*a* is a perspective view of a stove knob timer device according to another embodiment of the present invention.
Figure 6B:
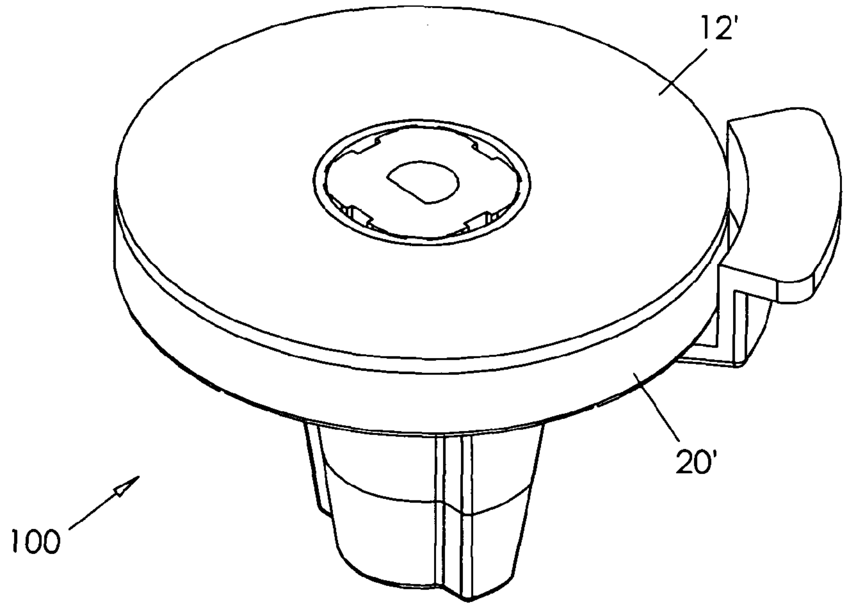
FIG. 6*b* is an inverted perspective view of the timer device as in FIG. 6*a;*

A circuit board 32 is situated in the main housing 20 and is sandwiched between a front side of the main housing 20 and the base member 12. The circuit board 32 is fixedly attached to the main housing 20 and, consequently, rotates when the main housing 20 is rotated. The circuitry of the stove knob timer device includes a processor 34, a timer 36, and a power source, such as a battery. It is understood that batteries may be held in the battery clips 38 shown in FIG. 2. A back side of the circuit board 32 includes a pair of metal contact strips 40. The front side of the base member 12 includes at least one spring 24 that is biased to extend toward the circuit board 32. Therefore, when the main housing 20 is rotated, e.g. to activate a respective stove burner, the circuit board 32 rotates such that the contact strips 40 and spring 24 make contact with one another and close an electrical circuit. FIG. 3*a* illustrates the spring 24 not in contact with the metal contact strips 40 which corresponds to the "off" configuration shown in FIG. 3*a*. FIG. 3*b*, on the other hand, illustrates the spring in contact with the metal contact strips 40 which corresponds to an burner activated configuration of FIG. 3*b*. This electrical circuit includes a connection to the timer 36 and activates it to function when the circuit is closed, as will be more fully described below.

A speaker 42 is situated on the circuit board 32 and is in electrical contact with the processor 34 and timer 36. The main housing 20 defines an opening 26 for enabling sound from the speaker 42 to be more freely emitted when activated (FIG. 2). A protective cover 28 is fixedly attached to a side wall of the base member 12 for shielding the speaker opening 26 from food or other debris. The cover 28 is positioned so as to cover the speaker opening 26 when the main housing 20 is in an "off" configuration and the speaker opening 26 is unobstructed thereby when rotated any amount, i.e. when the stove burner is activated for cooking.

The stove knob timer device 10 further includes a reset assembly 44 mounted in an front portion of the main housing 20 (FIG. 2). The reset assembly includes a reset switch 46 in electrical communication with the timer and processor circuitry. A tactile button cover 48 is situated atop the reset switch 46 and is accessible to a user's touch through an opening 30 in the front portion of the main housing 20.

The processor 34 includes programming for operating the timer and reset functions substantially as described below. When the main housing 20 is rotated, i.e. to activate a stove burner, the timer is activated as described above. After a predetermined time, the processor 34 in communication with the timer 36 actuates the speaker to emit a gentle sound such as a chime for reminding a user to monitor the status of the cooking that was previously initiated and to press the reset switch/button 46. If the reset switch 46 is pressed within a predetermined time, then the processor 34 in communication with the timer 36 will deactivate the speaker 42; otherwise, the processor 34 will actuate the speaker to continue emitting an audible sound. The sound, however, may be modified to a louder volume, a higher frequency, a more urgent pattern, or a combination of variations. The changes to the emitted sound are intended to urge a user more aggressively to monitor the cooking operation or even to gradually awaken a sleeping user.

In use, a user may retrofit an existing stove for use with the stove knob timer device 10 by removing an existing knob from a respective stove burner operational shaft and inserting the stove knob timer device 10 thereon as described above. The base member 12 may be adhesively adhered to the surface of the stove. When cooking is desired, the main housing 20 of the stove knob timer device 10 may be rotated in a traditional manner to activate the burner. Consequently, rotation of the main housing 20 actuates the timer 36 to wait a predetermined amount of time and then, in communication with the processor 34, to activate the speaker to emit a predetermined sound. Preferably, the initial signal to prompt a user to monitor the cooking event and to depress the reset switch 46 will be a gentle chime so as not to startle or shock the user unnecessarily. If the reset switch 46 is not pressed within the predetermined amount of time, a series of progressively more aggressive alarm sounds may be activated, as described above.

A stove knob timer device 100 according to another embodiment of the present invention is shown in FIGS. 6*a* to 10 and includes a construction substantially similar to that described previously except as specifically noted below. Similar components are referenced using primed reference numerals corresponding to the same characters referenced previously. In this embodiment, the entire stove knob timer device 100 is easily removable from a stove operational shaft. In other words, the base member 12' described above need not be permanently attached to the stove. Even though the base member 12' does not remain fixed against a stove surface but rather is firmly coupled to the stove burner operational shaft and is movable therewith, the timer 36' may still be "awakened" to begin timing upon an appropriate turning of the main housing 12'.

Figure 7:
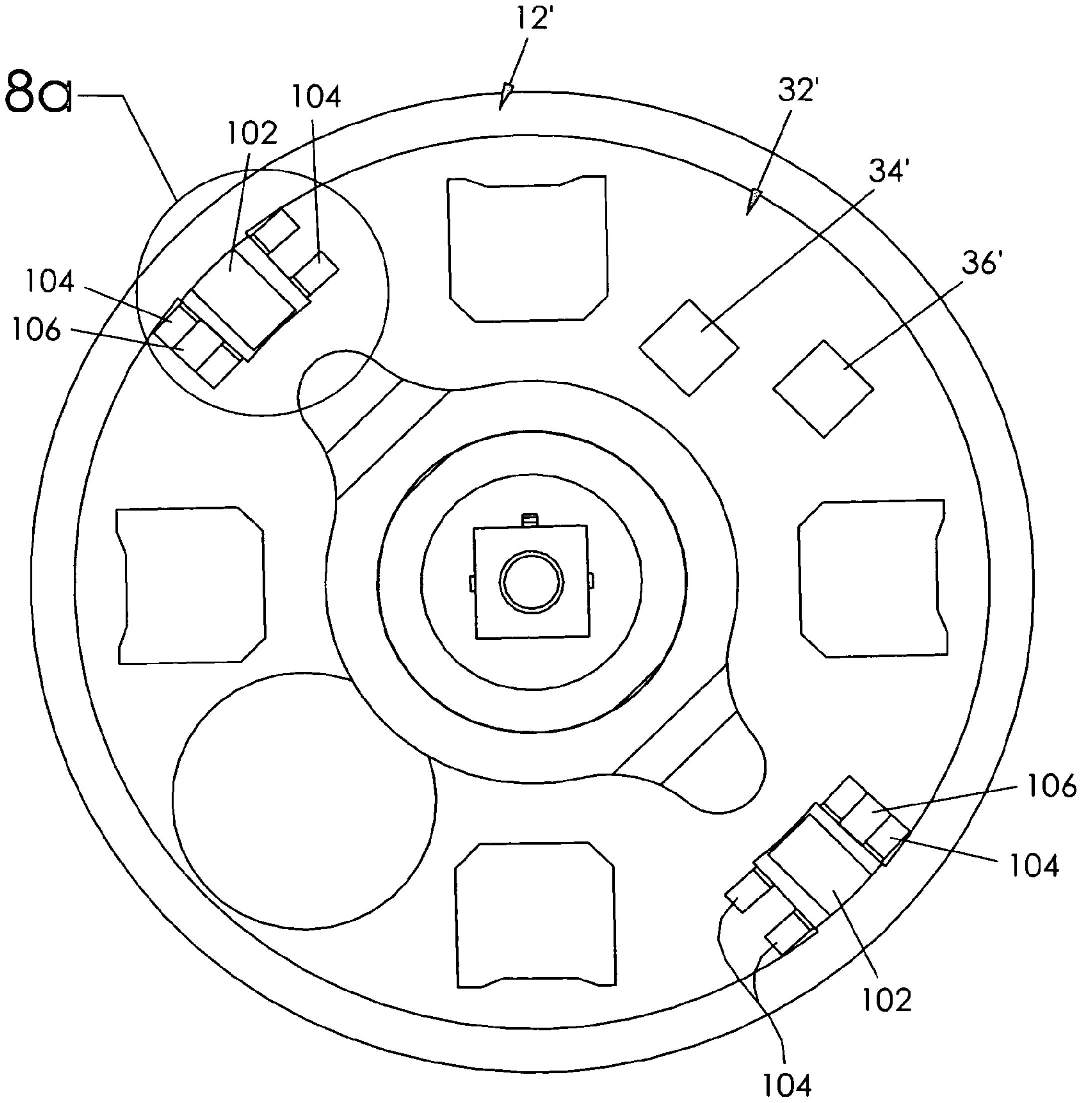
FIG. 7 is a top view of a circuit board mounted to a base member of the timer device according to the timer device as in FIG. 6*a;*
Figure 8A:
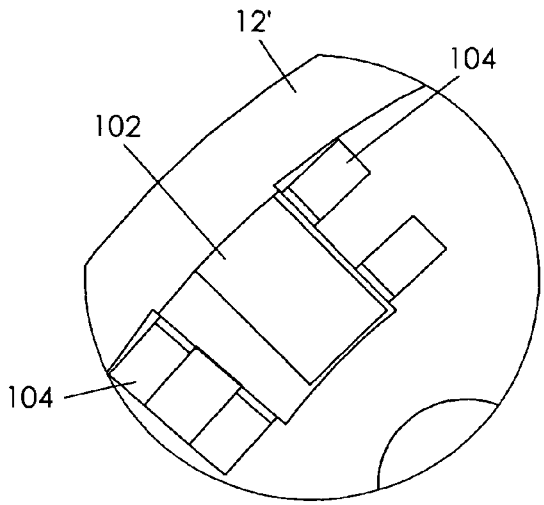
FIGS. 8*a*, 8*b*, and 8*c* are isolated views on an enlarged scale taken from FIG. 7, illustrating various configurations of the lugs and springs.
Figure 8B:
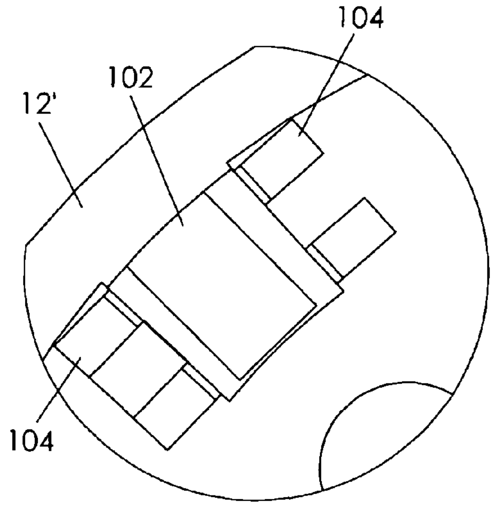
Figure 8C:
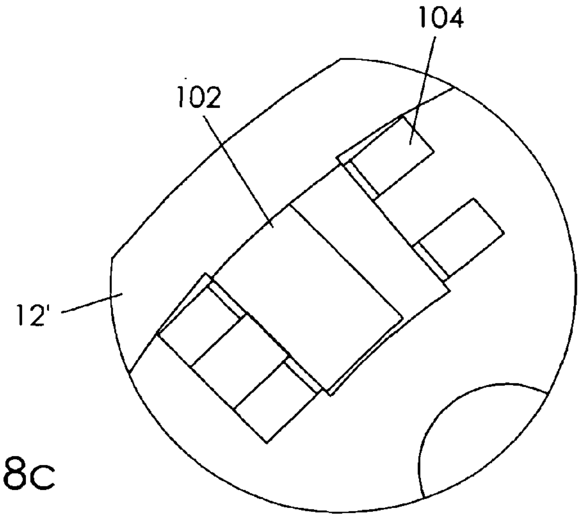
Figure 9A:
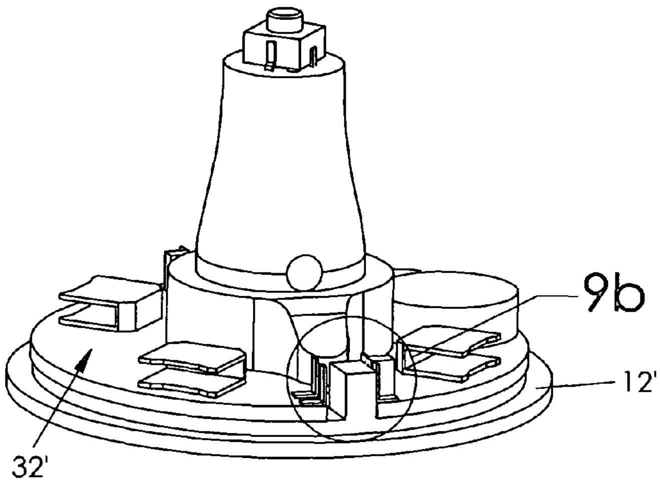
FIG. 9*a* is a perspective view of a portion of the timer device as in FIG. 10.
Figure 9B:
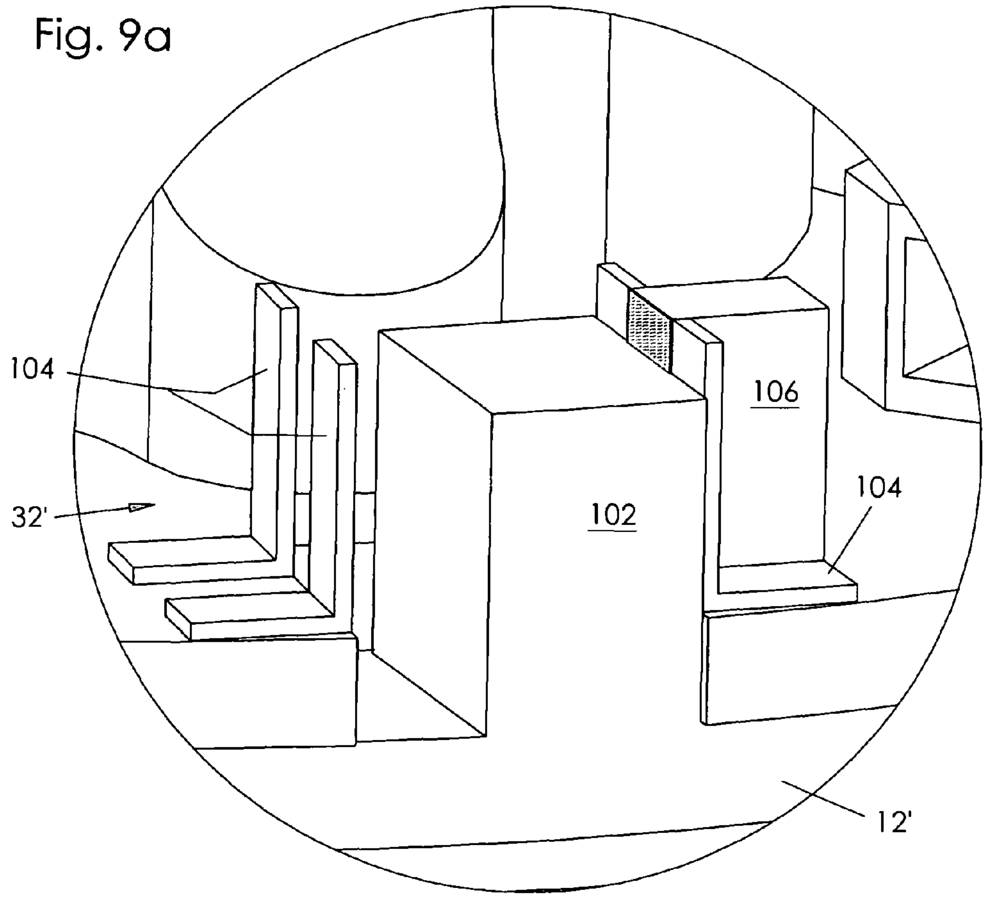
FIG. 9*b* is an isolated view on an enlarged scale taken from FIG. 9*a*.
Figure 10:
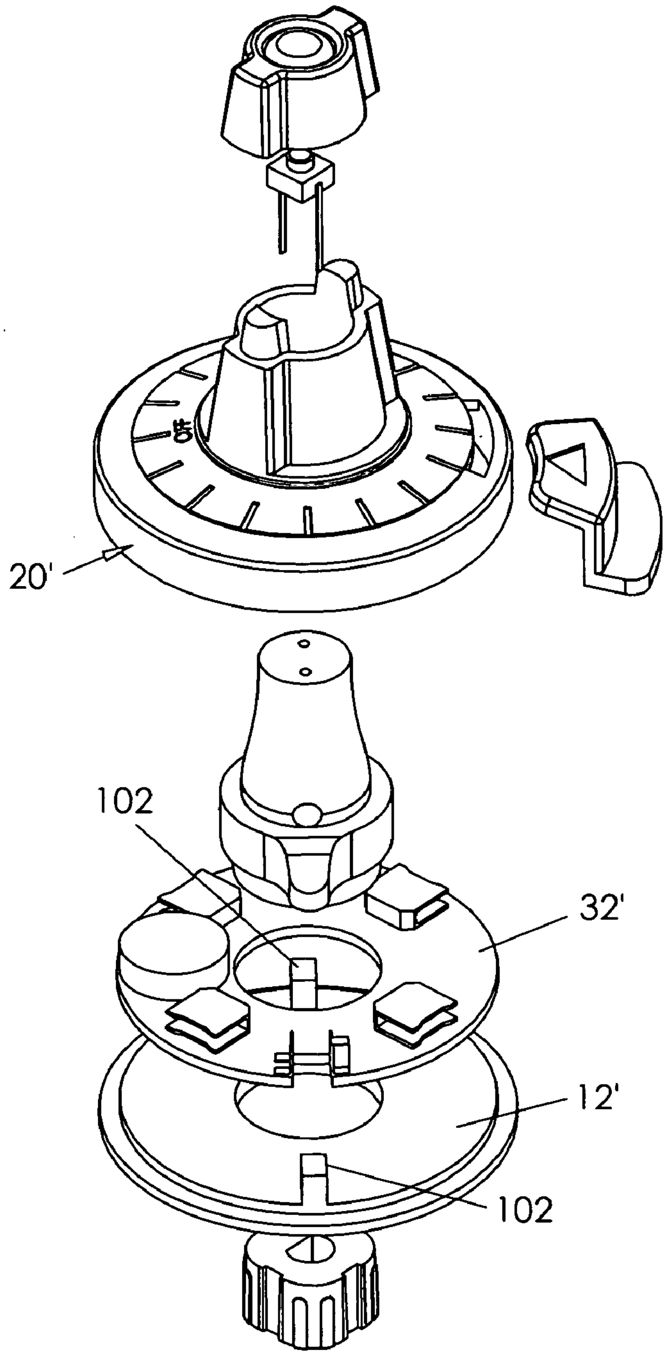
FIG. 10 is an exploded view of the timer device as in FIG. 6*a*.

More particularly, the base member 12' includes a pair of metal lugs 102 (FIGS. 7 and 10). Correspondingly, the circuit board 32' includes two pair of spaced apart springs 104. When the main housing 20' is rotated, i.e. to activate a respective stove burner, respective springs 104 will almost immediately make contact with respective lugs 102 (FIGS. 8*a*-8*c*). This will close a circuit in communication with the timer 36' and processor 38' and begin a timing sequence as described above. Conversely, rotating the main housing 20' in a direction so as to decrease burner temperature will move respective lugs 102 and springs 104 toward one another. However, electrical contact will not be immediately made in this direction as a rubber bumper pad 106 may be positioned on appropriate springs 104 (FIG. 9*b*). The purpose of the bumper pad 106 is to prevent an electrical connection (which would turn off the timer function) if only minor rotational force is applied to the main housing 20' (e.g. to merely decrease temperature). However, substantial rotational force could depress the thin rubber pad and, in fact, terminate a timer sequence, such as would be the case by turning the knob all the way to "off."

A now preferred embodiment 1000 of the stove knob timer device is shown in FIGS. 11*a* through 14*b* and includes a construction substantially similar to that described above in relation to FIGS. 1 through 5*b* except as specifically noted below. Similar components are referenced using double-primed reference numerals corresponding to the same characters referenced previously.

Figure 11A:
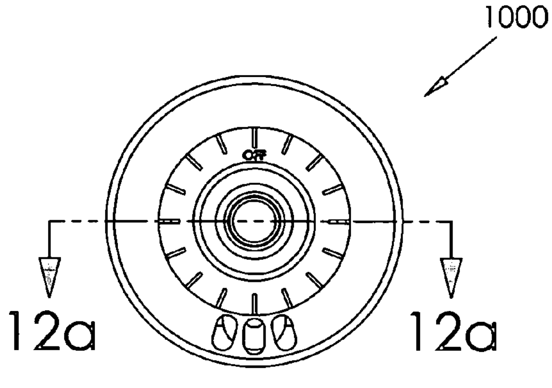
FIG. 11*a* is a side view of a stove knob timer device according to another embodiment of the present invention.
Figure 11B:
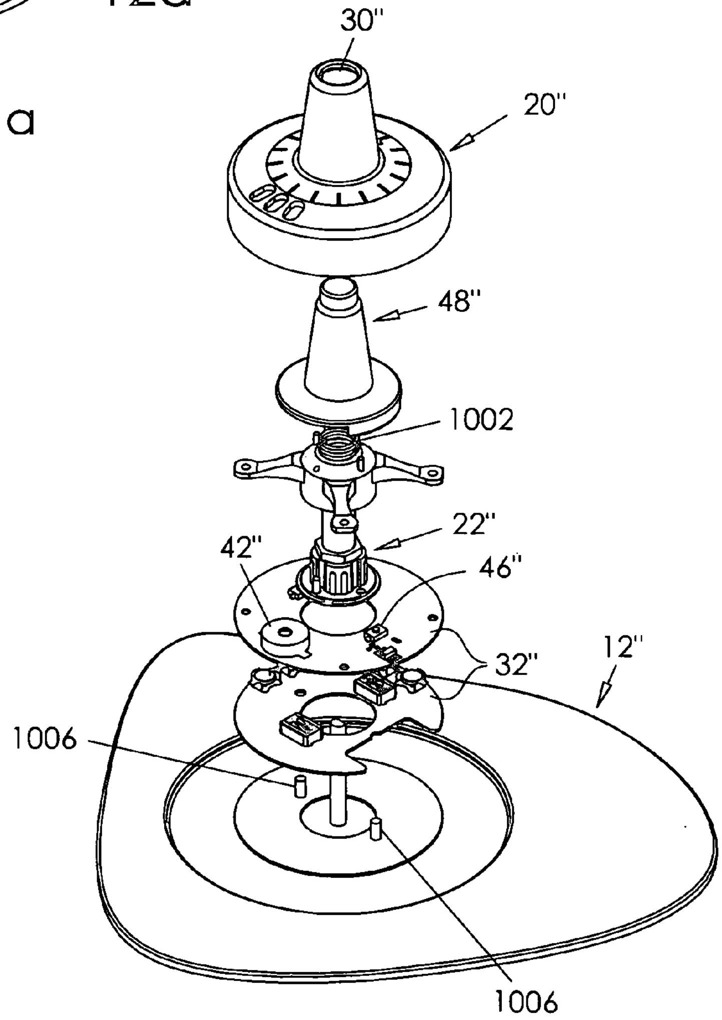
FIG. 11*b* is an exploded view of the stove knob timer device as in FIG. 11*a;*
Figure 13A:
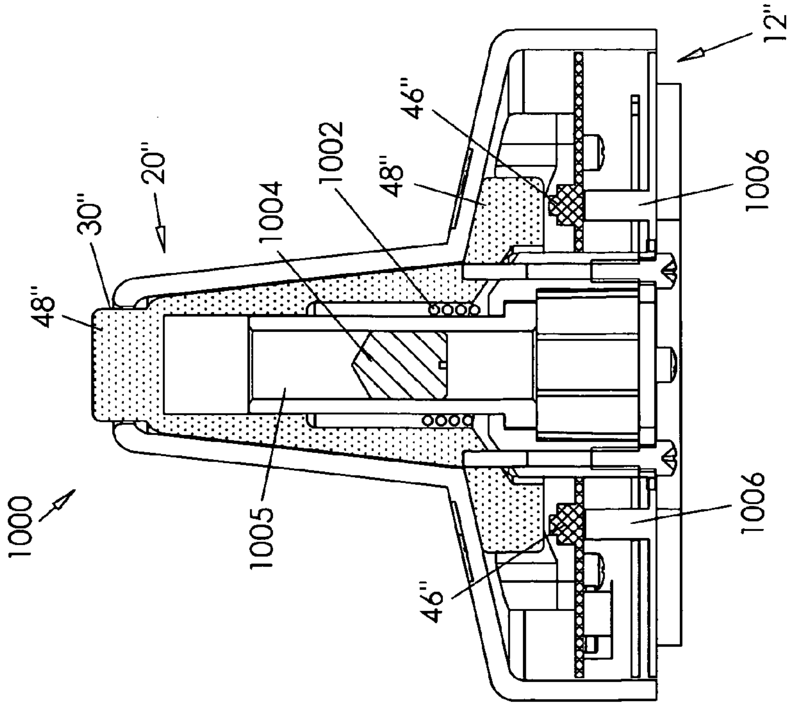
FIGS. 13*a* and 13*b* are sectional views as in FIG. 12*a* illustrating selective actuation of a reset button.
Figure 13B:
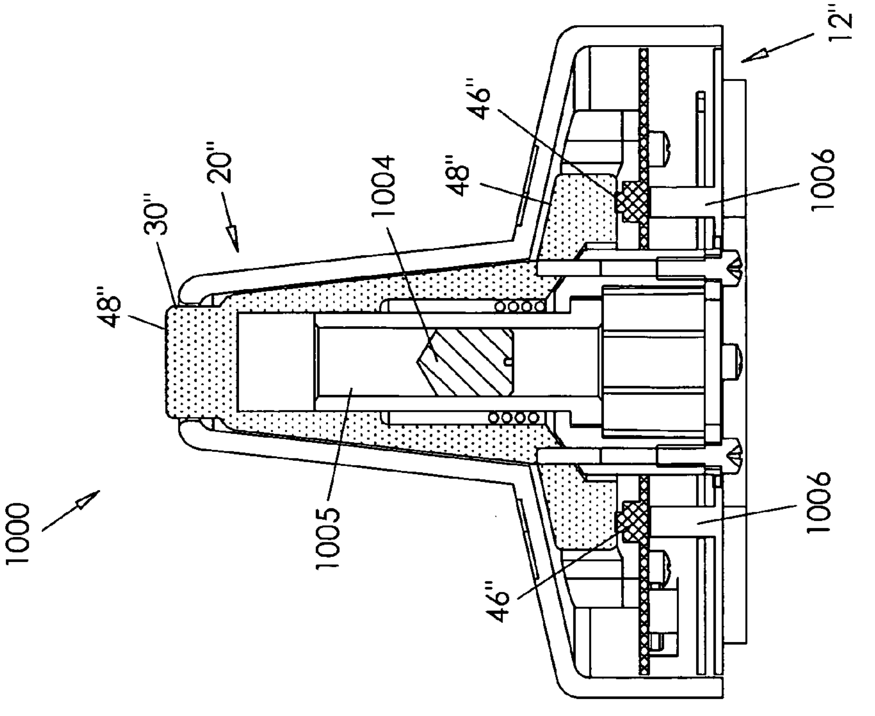

As shown in FIGS. 13*a* and 13*b*, the reset switch 46" may be located adjacent (and preferably attached directly to) the circuit board 32". The circuit board 32" may comprise multiple circuit boards coupled together (i.e., in data communication) as shown in FIG. 11*b*. The tactile button cover 48" may extend from adjacent the opening 30" in the front portion of the main housing 20" to the reset switch 46" so that pressing the tactile button cover 48" through the opening 30" actuates the reset switch 46" (FIG. 13*b*). Spring 1002 may bias the cover 48" away from the reset switch 46", as shown in FIG. 13*a*. A central hub 22" or collar may be included to generally hold the above mentioned elements in alignment and position relative to one another.

Figure 14B:
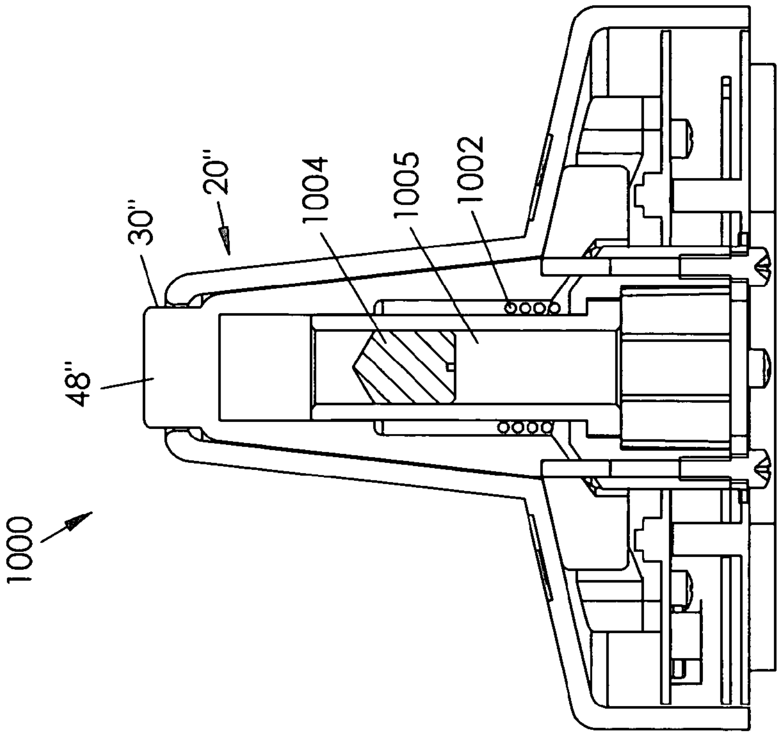
FIGS. 14*a* and 14*b* are sectional views as in FIG. 12*a* illustrating selective positioning of an adjustment set screw.
Figure 14A:
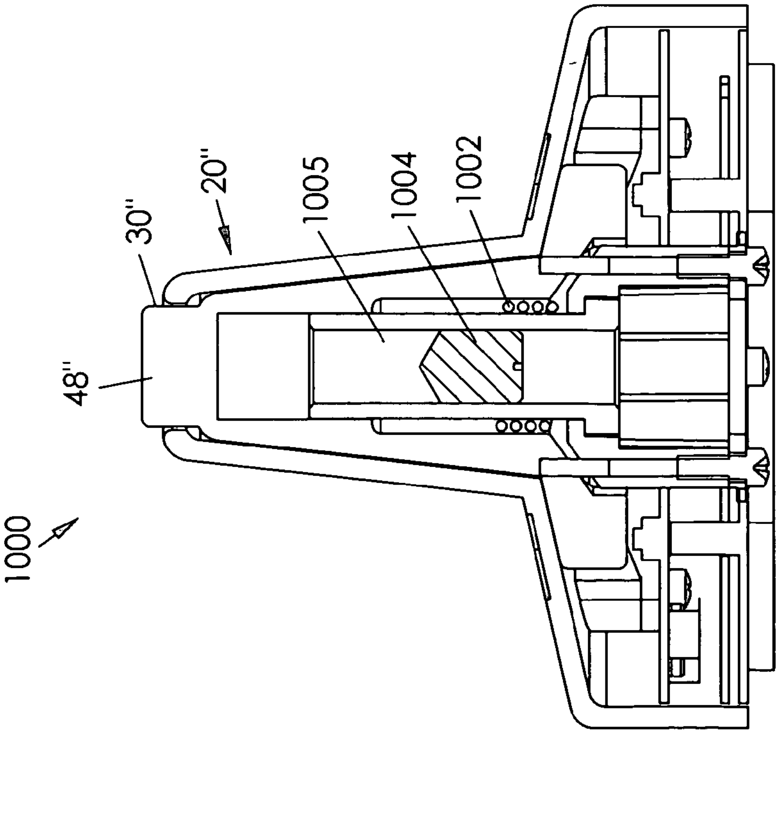

A set screw 1004 (FIGS. 14*a*, 14*b*) may be included to adjust or regulate an extent of a stove operational shaft is received into the main housing 20". The set screw 1004 may be raised or lowered, such as by adjustment in a channel 1005 positioned within the cover 48". This construction enables the present embodiment 1000 to be more universal than the previously described embodiments in that the embodiment 1000 to be used with operational shafts of different lengths. FIGS. 14*a* and 14*b* illustrate the set screw 1004 at different relative positions within the channel 1005 such that operational shafts (not shown) of respective corresponding lengths would be received within the channel 1005 when being mounted to a stove.

Figure 12B:
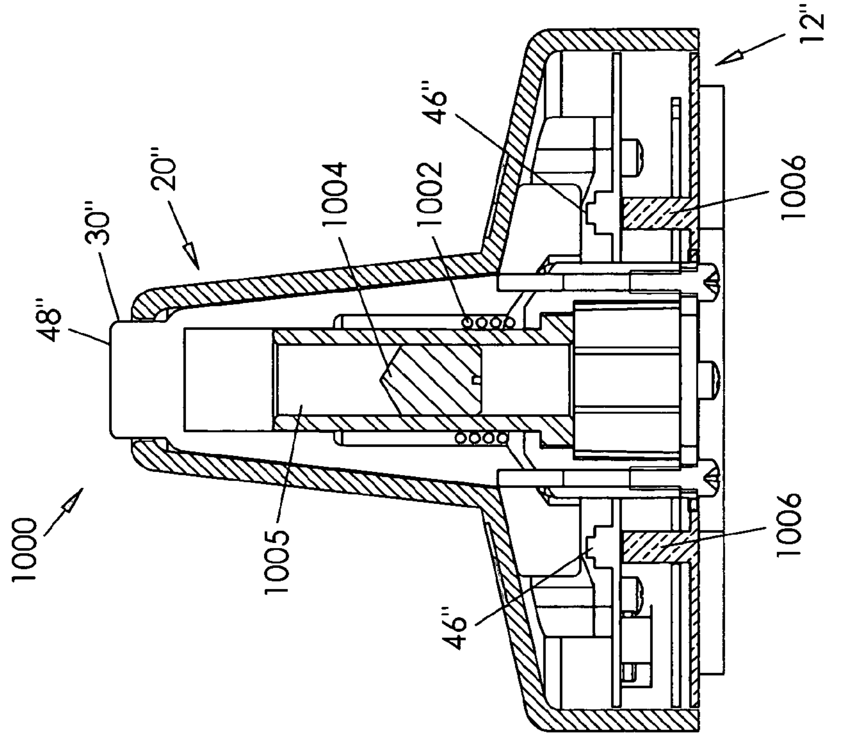
FIGS. 12*a* and 12*b* are sectional views taken along line 12*a*-12*a* of FIG. 11*b* and illustrating movement of the main housing on a base member vertical shaft.
Figure 12A:
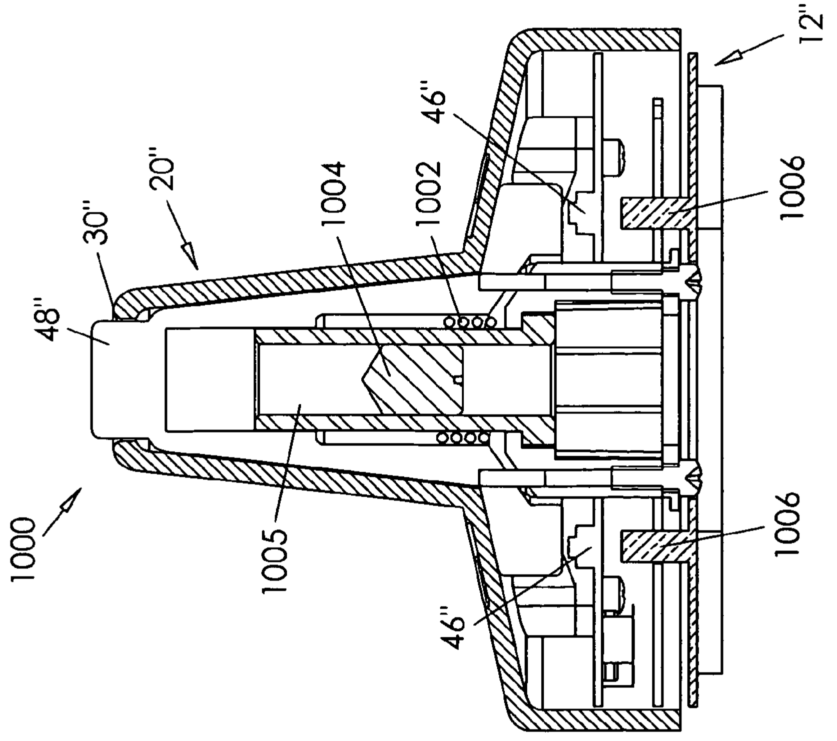

Another structure that enables the embodiment 1000 of the cap device to be more universal than the other embodiments is shown in FIGS. 12*a* and 12*b*. The main housing 20" may be vertically adjusted relative to the base member 12". More particularly, a plurality of vertical shafts (or "posts") 1006 may be coupled to the base member 12", and the main housing 20" may be slidable along the vertical shafts 1006. The vertical movement, sometimes more commonly referred to as "play") along the shafts 1006 may allow the embodiment 1000 to be used with stove knobs that require the operational shaft to be pressed in before rotation.

Figure 15:
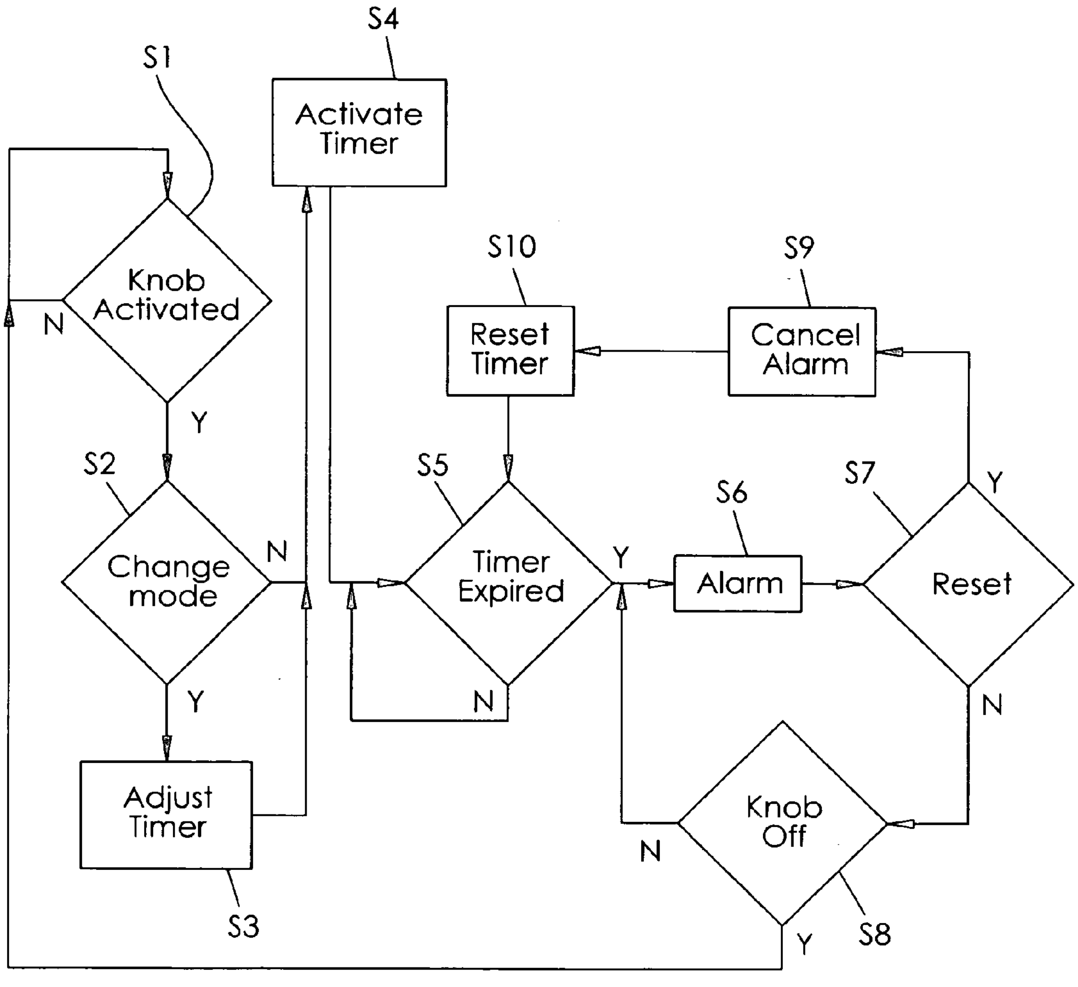
FIG. 15 is a flowchart illustrating the exemplary logic of the processor.

FIG. 15 shows exemplary logic utilized by the processor 34 during a method of operation after the stove knob timer device is coupled to a stove knob (i.e., a stove knob operational shaft). When cooking is desired, the main housing 20 may be rotated in a traditional manner to activate the burner. If the stove requires the operational shaft to be pressed in before rotation, the housing 20" may move along the shafts 1006. At step S1, the processor 34 may determine if the main housing 20 has been rotated. More particularly, when the main housing 20 is rotated, the contact strips 40 and the spring 24 may contact one another and close an electrical circuit, which is recognized by the processor 34. If the main housing 20 has been rotated, the logic proceeds to step S2; if not, the logic remains at step S1.

At step S2, the processor 34 determines if the user has utilized an input device to change a mode of operation (e.g., by holding the reset switch 46 down for a predetermined amount of time, by pressing the reset switch 46 a predetermined amount of times, by utilizing a different input device, etc.). For example, one mode may cause the alarm 42 to sound after five minutes, another mode may cause the alarm 42 to sound after ten minutes, and yet another exemplary mode may cause the alarm 42 to sound after fifteen minutes. Different modes can reflect the reality that it may be beneficial for reminders to be given more frequently when cooking some foods (e.g., frying fish) as opposed to others (e.g., simmering gravy). If the mode has been changed, the logic proceeds to step S3; if not, the logic proceeds to step S4. At step S3, the processor 34 adjusts the timer 36 to reflect the chosen mode; the logic then continues to step S4.

At step S4, the processor 34 activates the timer 36, or in other words, causes the timer 36 to begin counting down (or to) the chosen amount of time (i.e., the amount of time corresponding to the chosen mode in step S2). The logic continues from step S4 to step S5, where the processor 34 determines if the timer 36 has finished counting down (or to) the chosen amount of time. Once the timer 36 has finished counting down (or to) the chosen amount of time, the logic proceeds to step S6.

At step S6, the processor 34 activates the alarm 42. In one embodiment, the processor 34 first causes the alarm 42 to emit a gentle sound such as a chime for reminding the user that the stove is in operation and the reset switch 46 needs to be pressed; after a predetermined amount of time, the processor 34 then causes the alarm 42 to modify the sound to a louder volume, a higher frequency, a more urgent pattern, or a combination of variations to more aggressively urge the user to monitor the cooking operation or even awaken the user.

While the alarm 42 sounds at step S6, the processor 34 monitors the reset switch 46 (see step S7) to determine if the user has pressed the reset switch 46. If the reset switch 46 has not been pressed at step S7, the processor 34 monitors the rotation of the main housing 20 (see step S8) as set forth above. If at step S8 the processor 34 determines that the main housing 20 has been turned to an "off" position, the processor 34 deactivates the alarm 42 and the logic returns to step S1; if not, the alarm 42 continues to sound at step S6. If the processor 34 determines that the reset switch 46 has been pressed at step S7, the logic proceeds to step S9.

At step S9, the processor 34 deactivates the alarm 42 and continues to step S10. At step S10, the processor 34 again activates the timer 36, or in other words, causes the timer 36 to begin counting down (or to) the chosen amount of time (i.e., the amount of time corresponding to the chosen mode in step S2). The logic continues from step S10 to step S5, and the logic proceeds from step S5 as discussed above.

In yet another embodiment (not shown) of the stove timer knob, the main housing may engage a stove operational shaft and be actuated without a stationary base member. More particularly, the knob and operational shaft may be rotated and such rotation is sensed by the processor, this rotation causing the timer to be actuated.

It is understood that while certain forms of this invention have been illustrated and described, it is not limited thereto except insofar as such limitations are included in the following claims and allowable functional equivalents thereof.

The invention claimed is:

1. A stove knob timer device, comprising:

a base member;

a main housing rotatably coupled to said base member, said main housing being configured to receive a stove operational shaft;

a speaker;

a timer;

a reset switch;

a processor in said main housing, said processor being in data communication with said speaker, said timer, and said reset switch;

programming in said processor to actuate said speaker in a first manner upon said timer reaching a predetermined amount of time and to actuate said speaker in a second manner upon said speaker being actuated in said first manner for a predetermined period of time; and programming in said processor to deactivate said speaker upon actuation of said reset switch.

2. The stove knob timer device of claim 1, wherein said second manner has at least one of:

a louder volume, a different frequency, and a more urgent pattern, when compared to said first manner.

3. The stove knob timer device of claim 2, further comprising programming in said processor to actuate said speaker in a third manner upon said speaker being actuated in said second manner for a predetermined period of time, and wherein said third manner has at least one of:

a louder volume, a different frequency, and a more urgent pattern, when compared to said second manner.

4. The stove knob timer device of claim 3, further comprising means for actuating said timer upon rotation of said main housing relative to said base member.

5. The stove knob timer device of claim 1, wherein said reset switch is accessible through an opening in said main housing.

6. The stove knob timer device of claim 1, wherein:

said main housing defines an opening;

said reset switch is attached to a circuit board spaced apart from said opening;

a tactile button cover extends from adjacent said opening to said reset switch so that pressing said tactile button cover through said main housing opening actuates said reset switch.

7. The stove knob timer device of claim 1, wherein:

said main housing defines a channel;

said main housing includes a set screw situated in said channel and adjustable such that said channel is selectively configured to receive more or less of said operational shaft therein.

8. The stove knob timer device of claim 1, wherein said base member includes means for attachment to a stove surface, said base member defining a central opening through which said operational shaft is receivable.

9. The stove knob timer device of claim 1, wherein at least one vertical shaft is coupled to said base member and said main housing is configured to slide along said vertical shaft to move said main housing toward and away from said base member.

10. The stove knob timer device of claim 9, wherein:

said main housing defines a channel;

said main housing includes a set screw situated in said channel and adjustable such that said channel is selectively configured to receive more or less of said operational shaft therein; and compared to said first manner, said second manner has at least one of:

a louder volume, a different frequency, and a more urgent pattern.

11. The stove knob timer device of claim 10, further comprising:

a first contact coupled to said base member and a second contact coupled to said main housing, said first and second contacts being configured to interact with one another when said main housing is rotated relative to said base member;

programming in said processor to actuate said timer upon interaction of said first and second contacts; and programming in said processor to adjust said predetermined amount of time reached by said timer.

12. The stove knob timer device of claim 1, further comprising:

a first contact coupled to said base member and a second contact coupled to said main housing, said first and second contacts being configured to interact with one another when said main housing is rotated relative to said base member; and programming in said processor to actuate said timer upon interaction of said first and second contacts.

13. The stove knob timer device of claim 1, further comprising programming in said processor to adjust said predetermined amount of time reached by said timer.

14. A stove knob timer device for use with a stove having a stove operational shaft, said stove knob timer device comprising:

a base member;

a main housing rotatably coupled to said base member, said main housing defining a channel configured to receive said stove operational shaft;

a set screw positioned in said channel for relative movement therein such that a desired extent of said operational shaft is received into said channel;

at least one vertical shaft coupled to said base member, said main housing being configured to slide along said vertical shaft to move said main housing and said stove operational shaft toward and away from said base member;

a speaker;

a timer;

a reset switch;

a processor between said base member and said main housing, said processor being in data communication with said speaker, said timer, and said reset switch;

programming in said processor to actuate said speaker upon said timer reaching a predetermined amount of time; and programming in said processor to deactivate said speaker upon actuation of said reset switch.

15. The stove knob timer device of claim 14, wherein said base member includes means for attachment to a stove surface, said base member defining a central opening through which said operational shaft is receivable.

16. The stove knob timer device of claim 14, further comprising:

a first contact coupled to said base member and a second contact coupled to said main housing, said first and second contacts being configured to interact with one another when said main housing is rotated relative to said base member; and programming in said processor to actuate said timer upon interaction of said first and second contacts.

17. The stove knob timer device of claim 16, further comprising programming in said processor to adjust said predetermined amount of time reached by said timer.

18. A stove knob timer device for use with a stove having a stove operational shaft, comprising:

a base member;

a main housing rotatably coupled to said base member, said main housing being configured to receive said stove operational shaft;

a speaker;

a timer;

a reset switch;

a processor in said main housing, said processor being in data communication with said speaker, said timer, and said reset switch;

programming in said processor to actuate said speaker in a first manner upon said timer reaching a first predetermined amount of time and to actuate said speaker in a second manner upon said speaker being actuated in said first manner for a second predetermined period of time;

programming in said processor to deactivate said speaker upon actuation of said reset switch; and programming in said processor to adjust said first predetermined period of time upon receiving a user input.

19. The stove knob timer device of claim 18, further comprising:

a set screw positioned in said main housing for adjusting an extent of said stove operational shaft receivable into said main housing;

at least one vertical shaft coupled to said base member, said main housing being configured to slide along said vertical shaft to move said main housing and said stove operational shaft toward and away from said base member;

a first contact coupled to said base member and a second contact coupled to said main housing, said first and second contacts being configured to interact with one another when said main housing is rotated relative to said base member; and programming in said processor to actuate said timer upon interaction of said first and second contacts.

20. The stove knob timer device of claim 19, further comprising programming in said processor to actuate said speaker in a third manner upon said speaker being actuated in said second manner for a predetermined period of time, and wherein:

compared to said first manner, said second manner has at least one of:
- a louder volume,
- a different frequency, and
- a more urgent pattern;

compared to said second manner, said third manner has at least one of:
- a louder volume,
- a different frequency, and
- a more urgent pattern;

said main housing defines an opening;

said reset switch is spaced apart from said opening; and a tactile button cover extends from adjacent said opening to said reset switch so that pressing said tactile button cover through said main housing opening actuates said reset switch.

* * * * *